United States Patent [19]
Barnewall et al.

[11] Patent Number: 5,634,055
[45] Date of Patent: May 27, 1997

[54] METHOD FOR SELECTING ASSIGNMENTS

[75] Inventors: John C. Barnewall, Parker, Colo.; Walter D. Jourdan, Jr., Half Moon Bay, Calif.

[73] Assignee: BidPlus, Inc., Las Vegas, Nev.

[21] Appl. No.: 313,006

[22] Filed: Sep. 27, 1994

[51] Int. Cl.$^6$ .............................. G06F 17/30; G06F 17/21
[52] U.S. Cl. .................. 395/614; 395/605; 395/606; 395/613; 395/615; 395/209
[58] Field of Search .................... 395/600; 364/407, 364/413.01; 235/375

[56] References Cited

U.S. PATENT DOCUMENTS

| | | | |
|---|---|---|---|
| 4,845,625 | 7/1989 | Stannard | 364/407 |
| 5,006,985 | 4/1991 | Ehret et al. | 364/413.01 |
| 5,191,523 | 3/1993 | Whitesage | 364/407 |
| 5,253,166 | 10/1993 | Dettelbach et al. | 364/407 |
| 5,331,546 | 7/1994 | Webber et al. | 364/407 |
| 5,401,944 | 3/1995 | Bravman et al. | 235/375 |

OTHER PUBLICATIONS

Shirmohammadi et al., "Valuation of The Transmission Impact In a Resource Bidding Process", IEEE Transactions on Power Systems, vol. 6, No. 1, Feb. 1991.

Shirmohammadi, Dariush et al., "Valuation Of The Transmission Impact In A Resource Bidding Process", IEEE Transactions on Power Systems, vol. 6, No. 1, pp. 316–323 Feb. 1991.

"Bidding on Technology", Publication and date unknown, before May 1, 1994, by Parinello and DeAlba.

*Primary Examiner*—Thomas G. Black
*Assistant Examiner*—Cheryl Lewis

[57] ABSTRACT

A computer based method for employees to select and rank preferred possible assignments for submission to an employer. Criteria for selection may specify that a fraction of a characteristic of an assignment will qualify. The extent to which each criteria reduces the number of assignments that qualify is graphically displayed. The employee is allowed multiple searches each with different criteria without creating redundancy in the selected assignments.

12 Claims, 3 Drawing Sheets

FIG. 3

| | 2 | 40 | 144 | 1004 | 1013 | 1018 | 1023 | 1028 |
|---|---|---|---|---|---|---|---|---|
| | 1065 | 1075 | 1079 | 1103 | 1125 | 1130 | 1135 | 1169 |
| | 1179 | 1184 | 1185 | 1186 | 1189 | 1190 | 1191 | 1192 |

31 01 02 03 04 05 06 07 08 09 10 11 12 13 14 15 16 17 18 19 20 21 22 23 24 25 26 27 28 29
WE TH FR SA SU MO TU WE TH FR SA SU MO TU WE TH FR SA SU MO TU WE TH FR SA SU MO TU WE TH 3898                3898                3898
ORDSFO    SNAMCOMIA SFO    SNAMCOMIA SFO    SNAMCOMIA SFO

Days Off: 17         Bid Group: 4
Credit Time: 69.37   #F/A 1    Bid Position: 17   1179

ID# 3148    Check-In: 1530    TTL: 11.17    M/S: 45.42

| Equip | Flt# | Origin | Dest | Dep | Arr | L/O | FTM | ACM | DMT | Layover Hotel/Phone |
|---|---|---|---|---|---|---|---|---|---|---|
| 57G | 0154 | SFO | ORD | 1630 | 2228 | 11.17 | 03.58 | 03.58 | 05.13 | HOLIDAY INN–DES PLAINES 708-296-8866 |
| 57G | 0984 | ORD | SFO | 0945 | 1216 | 01.14 | 04.31 | 04.31 | | |
| 57Q | 1595 | SFO | SNA | 1330 | 1458 | 01.27 | 01.18 | 05.59 | | |
| 57Q | 1154 | SNA | SFO | 1625 | 1743 | 00.00 | 01.18 | 06.77 | 11.13 | |

O/L-> 5.55

METHOD FOR SELECTING ASSIGNMENTS

This invention pertains to the problem of assigning a large number of employees to a large number of possible different assignments based on employee preferences. In particular, this invention is a method of allowing employees to use computer searching and organization capabilities to identify the desired assignments from a large number of possible assignments and rank them in a preferred order.

BACKGROUND

The prior art is best exemplified by systems for allowing airplane flight crew members to designate their preferred lines of flying ("LOF") assignments and rank them in a preferred order for presentation to the employer. In the prior art systems, the employees are presented with a database searching tool to help them identify their preferred assignments. The searching tool allows them to work with a manageable number of criteria, such as twelve, each of which can be compared with each assignment to determine whether the assignment meets that criterion. The prior art methods fall in one of three categories.

The first category is known as the Priority Method. In this method, the employees are required to give a priority ranking to the criteria. A database search is then initiated. The assignments are presented in a ranked list. Those assignments, if any, which meet all the criteria are listed first. Those which meet all the criteria except for the last priority criterion are presented second. Those assignments which meet all criteria except the last two priority criteria are listed third; and so forth. Last on the list are assignments which meet none of the criteria, and next to last on the list are assignments which meet all but the highest priority criterion.

The system assumes that the resulting list is in the order desired by the employee. However, if it is not, the employee can use an editor to adjust the sequence of the assignments. If the employee knows of certain desired assignments before using the database searching tool, those assignments can be placed at the head of the list before the search is commenced. Alternatively, they can be moved to the head of the list after the search is completed if the employee can find them in the list.

In the Priority Method, if a particular assignment meets all the criteria except the highest priority criterion, it is at the bottom of the list, lower than other assignments which fail to meet more than half of the criteria. This system is deficient because seldom, if ever, in the judgment of employees, is there an absolute hierarchy of criteria. Rather, an assignment which meets most of their criteria is preferred over an assignment which meets only one of their criteria, even if that criterion is their highest priority criterion.

The second category is known as the Scoring Method. Each of various criteria is given a score. The computer system then searches the database and calculates a total score for each of the assignments. It then ranks them in the order of highest to lowest score. Like the Priority Method, this method performs one search for attractive assignments using one set of criteria. It does not allow the employee to conduct two searches with inconsistent sets of criteria, both of which might be attractive to the employee.

The third category is known as the Matching Method. This method places at the top of the list those assignments which meet all of the criteria, then places second those that meet all but one of the criteria, with a secondary ranking within the group according to the relative importance of which criteria was not met, etc.

Under the prior art systems, it is not possible to adjust one or more criteria to make them less restrictive and perform additional searches to find other assignments which meet the somewhat less restrictive criteria. Each criterion may be specified only once as a single value. Once all the criteria are specified, each of the prior art systems performs one search and selection process.

SUMMARY OF THE INVENTION

In the invented system, the employees are not required to specify a priority ranking among the criteria, and the employees can conduct multiple searches using different criteria each time. An employee using the system first specifies a set of narrow, highly desirable criteria. A search is conducted to identify all the assignments which meet these restrictive criteria. They are assembled as a group and placed at the head of the list. Then, the employee relaxes one or more criteria or changes completely certain criteria to a quite different but also attractive choice. Then a search is performed again and the new assignments which are found are assembled as a second group and added next on the list. This process is completed as many times as the employee desires to produce a ranked list of groups of assignments which is as long as the employee desires.

The employee then has the option of editing the list of groups to change the ranking of groups or delete entire groups. After the groups have been arranged as desired, the employee may edit assignments within groups or from one group to another to adjust their ranking in the priority list or delete undesirable assignments. The ranked list is then submitted to management, which then assigns employees to assignments based on their preferences.

The invented system includes the ability to specify that a characteristic of each assignment which includes large numbers of individual entries should be examined for the fraction of the entries that meet a specified criterion. For example, the employee can specify a criterion which requires that more than 80% of the flights should be on a certain type of aircraft or that less than 10% should be on another type of aircraft.

As the computer system considers in turn each criterion to find assignments, the number of assignments which pass gets smaller and smaller. In the invented system, the number remaining after each criterion has been considered is displayed numerically and shown in relative magnitude with a bar graph. This tells the employee which criteria are highly restrictive, knocking out a large percentage of possible assignments, and which criteria have relatively little effect. They can use this information to relax or stiffen one or more criteria to achieve the desired search.

BRIEF DESCRIPTION OF THE DRAWINGS

FIG. 3 shows the user interface display for editing assignments within groups.

DETAILED DESCRIPTION

Airlines administer complex employee preference polling systems for granting assignments to their flight crew members. The systems assign hundreds of different schedules to thousands of crew members. The smallest, most fundamental component of each assignment is the individual flight of an aircraft. Each leg of a flight is documented as to the type of aircraft flown, flight number, departure and arrival points/times, flight duration, time between legs, and days of the week the flight operates. These legs are then grouped into days of flying, which are further grouped into informational units called "pairings" or "IDs". An ID is a representation of a single "trip" that a pilot or flight attendant might make, and has an identification number associated with it. An ID may represent a trip of varying length, from 1 to 7 or more days. In addition to the specific flight information described above, an ID contains information related to layover length, duty time, meal money, and check-in times.

IDs are themselves the fundamental components of a larger information matrix. IDs are the building blocks from which "Lines of Flying" (LOF) are constructed. An LOF is a representation of a period of time (usually the next calendar month) when specific IDs will be flown. Typically, an ID's identification number will be shown under a given day or date, indicating that the specific information contained in the ID should be applied at that time. As the number of flights, IDs and LOFs increase, relationships between various informational units grows exponentially.

Each month, flight crew members process this information and select a list of schedules of flying for the coming month. This list is then submitted to the airline, which in turn, assigns the submitted schedules to crew members, typically on the basis of seniority.

Figure 1:
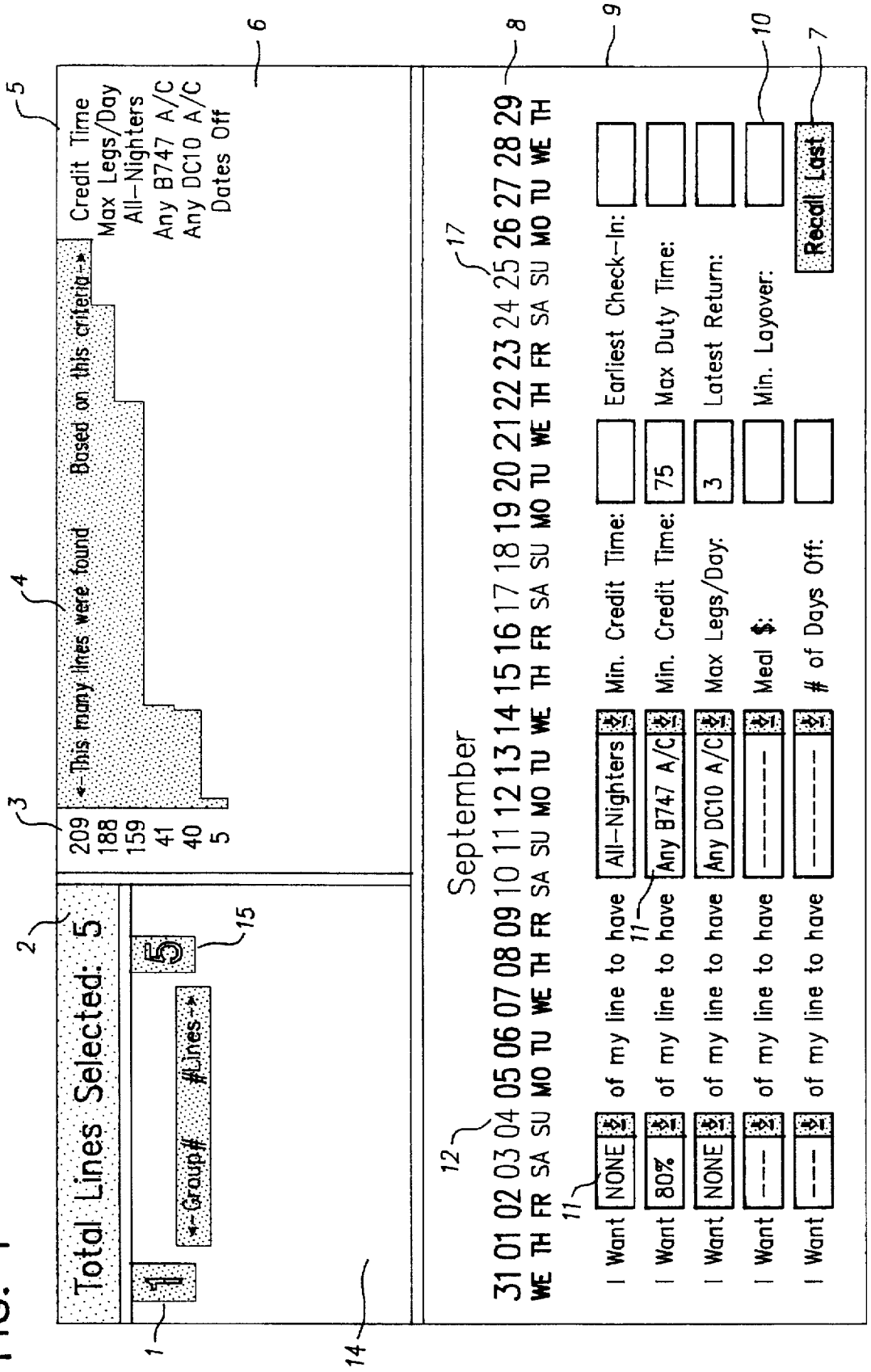
FIG. 1 shows the user interface display for selection of the first group of assignments.

The invented system receives multiple sets of assignment preference criteria and applies absolute search and selection logic to the database of possible assignments. As shown in FIG. 1, the user interface supports the input of the sets of criteria and presentation of results through an easily understood graphical representation. A main window is split into three smaller windows: the Main Group window 14, the Group Summary window 6, and the Criteria window 9.

Figure 2:
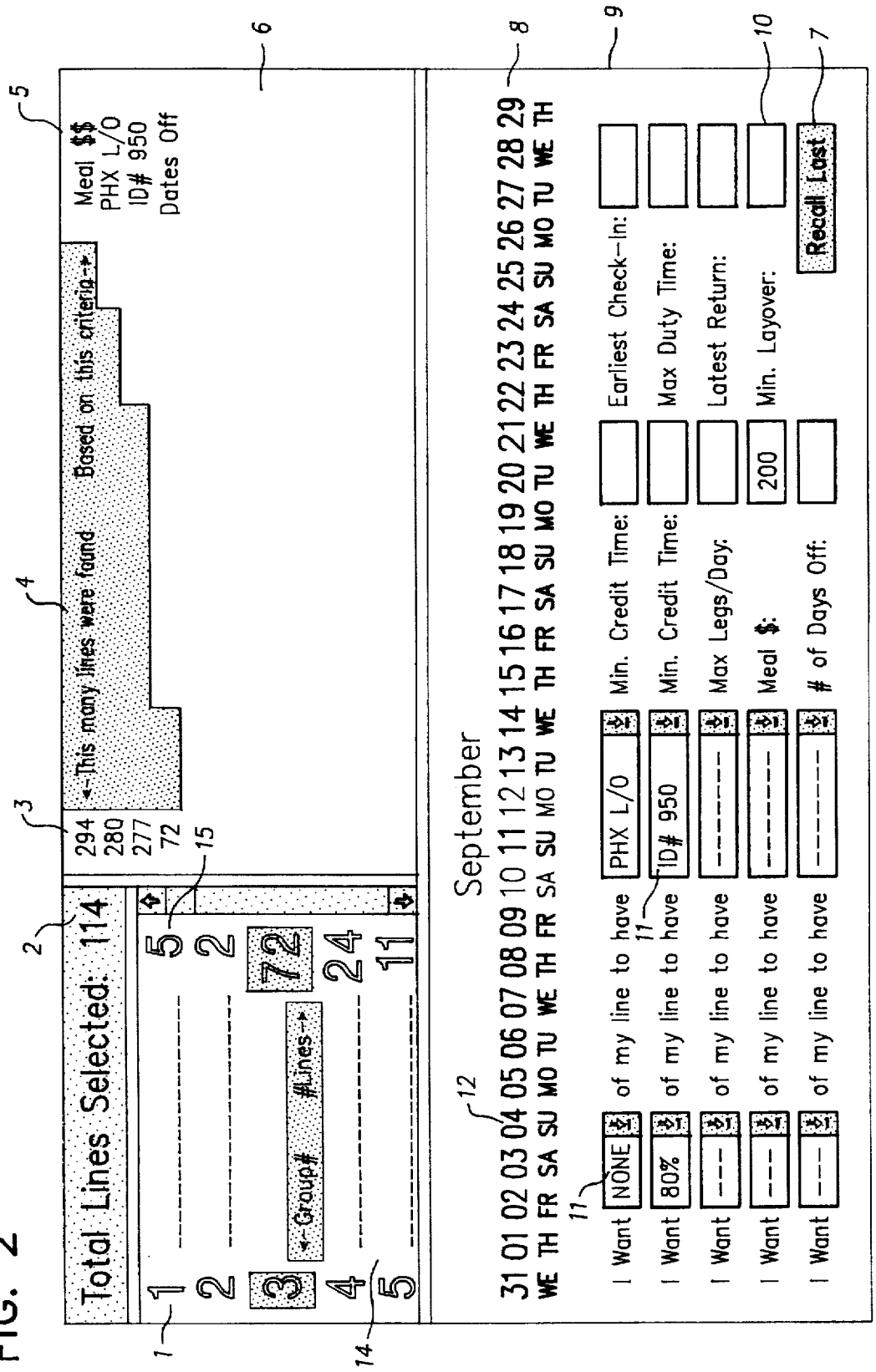
FIG. 2 shows the user interface display after five groups have been selected, and the third group is highlighted and shown in detail.

The Main Group window 14 displays all active group objects. Groups are indicated by their group number 1 and the number of LOFs meeting that group's criteria 15. Above this window is an indicator of the total LOFs selected 2. This number represents all of the Lines selected by all of the groups (all the groups in the Main Group window). If there are more group objects than can be displayed at one time in the window, the user may scroll down through the window using the scroll bar at the right side of the window, as shown in FIG. 2.

The Group Summary window 6 is located to the right of the Main Group window. This window depicts all of the criteria contained in the currently selected (active) group object. On the right side of the window, is the name of a specific criterion category 5, such as 747's. On the left side is the number of LOPs found that meet that criterion 3. Successive criteria/LOF information is displayed vertically down the Y axis. In between the criterion description and the LOP count figure, is a blue bar 4 that gives a graphical representation of how many LOFs were found meeting the specific criterion. As the display progresses down the Y axis, this bar has the effect of presenting the user with a bar chart. This chart represents the deterioration that occurred during a given database query. The final, or bottom-most entry in this window indicates how many LOFs met all of the criteria for this group.

At the bottom of the main window is the Criteria window 9. This window provides the user with a complete description of all criteria associated with this group. It is here that the user inputs, changes, and reviews all criteria. Criteria pertinent to this selection group is available for display at all times. There is no need for the user to access dialog boxes, or other "viewports" into the selection criteria database.

The group objects in the Main Group window may be edited individually or collectively. Groups may be re-prioritized by selecting, cutting, and pasting. This provides the user the option of easily implementing significant changes in preference order for assignments. At any one time, user editing may affect a single Line, or hundreds of Lines—with 2–3 clicks of a mouse. Existing groups may be deleted, and new groups may be added at any time. Group objects also shield their member LOFs from any editing/selecting activities that the user may engage in elsewhere in the application. A given group's selection criteria may be changed in part or in its entirety and have no effect on the other groups in the Main Group.

The subject invention allows the user to construct a multi-level assignment preference list based on absolute search/selection criteria. Referring to FIG. 1, the user begins this process by constructing a group object. Upon initialization, the application will display an empty group object in the top of the Main Group window 14. Construction begins with the user designating the selection criteria to be associated with this group in the Criteria window 9.

Assume the user is a crew member that needs to have weekends off, does not want to fly all-night trips, wants any type of 747 aircraft, no DC-10 aircraft, a maximum of 3 flight legs per day, and a minimum of 75 hours of credit time. There are three means of selecting criteria. The first, day on/off selection is accomplished via the selection bar at the top of the Criteria window 8. By default, the selection bar initializes with the assumption that the user will be available to fly every day of the month. Therefore all days are colored black. To designate a day/date off from work, the user clicks in the area of that day/date 17. Both the day and the date turn red to indicate that no duty will be performed on this day. Now every LOF that is selected for this group will have this day/date off.

The day/date selection bar possesses two additional information display features. First, if the airline has designated a specific date to be a holiday, the interface will display that date 12 in green. This is of particular interest to a crew member for pay considerations. The second display feature is a vacation bar. If the crew member designates a vacation period during this month, the vacation bar displays this period by appearing over the dates associated with the vacation. This assists the user in implementing selection strategies that may be affected by vacations.

The second means of criteria selection is the criteria drop box 11. These boxes are utilized when criteria possess unique selection qualities. For example, it is relatively easy to designate an absolute quantitative value to the maximum number of legs per day a user may want to fly. It is much more difficult to designate how many legs in the entire month you want to fly on 747 aircraft. The value under consideration changes drastically day to day, ID to ID, LOF to LOF. What is required is a mechanism to convey a general desire defined in terms of percentage. The criteria drop boxes provides this mechanism. Each criteria designation takes the form of a sentence that must be completed by the user. The sentence contains two drop boxes. The first one designates the quantitative percentage value. Values can be designated in terms of None, Any, All, or from 10 to 90 percent in 10% increments. The second drop box in the sentence designates the criterion to be considered, for example Any 747 Aircraft.

The third means of criteria selection are the criteria selection boxes 10. These boxes are straightforward in intent and use. The user simply fills in a value that should be applied to the corresponding criterion category. For example, if the user wants to fly no more than 3 legs a day, a value of 3 is placed in the box next to Max Legs/Day.

To continue the illustration, the user would enter the criteria described above. When all criteria have been entered, the user clicks an on-screen function button labeled search (not shown). At that time, all LOFs that precisely meet the selection criteria are selected from the source database. A number 15 appears in the Main Group window opposite the group number 1. This number indicates how many LOFs met all criteria requirements. Additionally, in the Summary window 6 the user is presented with a graphical representation of search results and deterioration. All criteria that were designated in the Criteria window, are reflected on the right side of the summary window 5. To the left of each criterion is a number 3 that represents the number of LOFs that met that criterion out of the database. In our illustration, 209 LOFs were found that met the credit hour requirement. Of those 209 LOFs, 188 met the 3 legs per day criterion. Of those, 159 were not all night trips, etc. The bottom most value indicates that there were a total of 5 LOFs that met all criteria associated with this group. The blue Deterioration Display Bar 4 gives a graphical representation of the progressive deterioration that occurred during the search. When LOFs have been selected and stored in a given group, they a re then removed from consideration in any other search performed in any other group. If an LOF or an entire group is deleted, the affected LOF(s) are once again included in database queries.

Unless the employee using the system is the most senior employee, it is unlikely that 5 LOFs would be sufficient to complete an adequate list of preferred assignments. To select more LOFs, the user adds a new, empty group. To complete this group, the user would repeat the procedure described above. To stay relatively close to the original search requirements, the user may want only to make minor adjustments in the search criteria. For example the user may simply want to remove the criterion to have all Saturdays off, but keep the rest of the group the same. To do this, the user would click a button labeled Recall Last 7. This function button loads the criteria from the preceding group into the new, empty group. If the user were to click the search button at this time, there would be zero LOFs found, since they were all selected in the first group. If however, the user simply de-selects the Saturdays that were previously selected in red, the nature of the group has changed Performing a search at this time provides two additional LOFs. This process of adding new groups and modifying selection criteria would continue until the user had selected a sufficient number of LOFs to submit a bid to the airline, as shown in FIG. 2.

If desired by the user, entire groups of LOFs may be edited. This gives the user the ability to completely restructure the constructed list of assignments, moving and re-prioritizing hundreds of LOFs at a time with two button clicks. To cut group(s), the user simply selects an individual group or a set of groups (by clicking and dragging the mouse over the groups to be cut). The user then clicks on a scissors button (not shown). To paste the groups, the user positions the cursor (highlighted group) at the location desired, and clicks a paste button (not shown). Group deletion can be accomplished either by "cutting" over groups already in the cut buffer, or by pressing a delete button when group(s) have been selected.

The next likely step in our example would be the examination of the LOFs that were selected in all of our groups. The user would want to verify that the Lines selected indeed met the criteria that were established. Additionally, the user may desire to perform some editing of the selected LOFs. Certain Lines that were selected may not be desirable for reasons other than selection criteria (for example, a hotel at a given layover location may be unsuitable). Conversely, LOFs that met the fundamental criteria may be more desirable for some other reason, and may need to be moved up in priority. Viewing and editing of this kind is done from the Main Review window FIG. 3. This window is divided into three smaller windows; the Group Display window 18, the Line display window 20, and the ID display window 24.

The user is presented with the LOFs that were selected in the Group being reviewed as shown in FIG. 3. The LOF numbers are displayed in the Group Display window 18. If there are more LOFs than can be displayed at one time, a scroll bar is activated on the right side of the display. The scroll bar provides the means to scroll through all LOFs in the display. The LOF numbers in and of themselves are relatively meaningless in terms of information. What is required is a description of the flying/duty the LOF number represents. This is provided in the Line and ID display windows. The Line display window 20 displays the complete Line of Flying for the LOF that is highlighted in blue in the Group Display window 19. To view the complete Line for a different LOF in the Group Display window, the user clicks the LOF number. It is then highlighted and becomes the new active LOF. To edit the displayed LOFs the user has many options. To cut Line(s), the user simply selects an individual LOF, a group of LOFs (by clicking and dragging the mouse over the Lines to be cut), or non-contiguous LOFs (by double-clicking individual LOFs). The user then clicks on the scissors in a button bar at the top of the Main Review window (not shown). To paste cut Lines, the user positions the cursor (active LOF) at the location desired, and clicks the Paste button in the button bar. Line deletion can be accomplished either by "cutting" over Lines already in the cut buffer, or by pressing the Delete key when LOF(s) have been selected.

The Line currently being viewed is shown in the Line Display window 20 in large blue numbers in the center of the display 23. The window possesses a calendar display bar which appears identical to the day/date selection bar in the Criteria window. The calendar display also displays holidays in green for easy reference, and will display a vacation bar if appropriate. Positioned under the calendar display are specific ID numbers 20. The location of these ID numbers correlates to the time they are to be executed. If a portion of an ID falls on a holiday, the holiday pay that is appropriate for the user's pay grade is computed and displayed at the bottom left of the window. By contractual agreement, if a portion of an ID falls within a vacation period, this ID does not have to be flown. Therefore, those IDs which fall into a displayed vacation period are displayed completely in green to indicate they are not to be flown. Under the ID numbers are the layover/return cities for a particular day. One pairing of ID number and layover cities is always indicated in red. This is the currently active ID. This is the ID which is displayed in detail in the ID Display window 24. To view a different ID in the LOF, the user clicks in the vicinity of the desired ID number/layover city grouping. Also indicated in the Line Display window is the group to which this LOF currently belongs 22. The relative position within the entire ranking is also displayed.

Below the Line Display window is the ID display window 24. This window provides all information contained in a particular ID. If the information to be displayed exceeds the physical dimensions of the window, a scroll bar appears which allows the user to view the ID in its entirety. The ID number currently active is displayed in red at the top left portion of the window 21.

We claim:

1. A method for allowing employees to select and rank their preferred job assignments, comprising:
   (a) creating a computer readable database with a record for each possible assignment, each record including more than six data elements which data elements each specify a characteristic of the assignment;
   (b) receiving input from an employee at a computer terminal specifying a first set of criteria, searching the database for a first group of records whose data elements meet all the criteria, copying the first group of records to a memory;
   (c) displaying to the employee information showing the number of records in the first group;
   (d) receiving input from the employee at the computer terminal specifying a second set of criteria, searching the database for qualifying records whose data elements meet all the criteria, comparing the records to those already in the memory, and copying to the memory, as a second group of records, those qualifying records which are not already in the memory.

2. The method of claim 1 wherein the first group of records and the second group of records are copied to the memory in locations which, upon presenting the contents of the memory, cause the first group of records to be presented first and the second group of records to be presented second.

3. The method of claim 2 further comprising:
   (a) displaying to the employee information showing the number of records in the first and second groups;
   (b) receiving input from the employee at the computer terminal specifying a third set of criteria, searching the database for third qualifying records whose data elements meet all the criteria, comparing the qualifying records to those already in the memory, and copying to the memory, as a third group of records, those qualifying records which are not already in the memory.

4. The method of claim 3 further comprising:
   (a) receiving from the employee instructions to delete a group of records from the memory or modify the sequence of groups of records in the memory; and
   (b) executing the instructions.

5. A method for allowing employees to select and rank their preferred job assignments, comprising:
   (a) creating a computer readable database with a record for each possible assignment, each record including more than six data elements which data elements each specify a characteristic of the assignment;
   (b) receiving input from an employee at a computer terminal specifying a set of criteria, including a criterion that a record will qualify if a fraction of its data elements, which fraction is less than all and more than none, meets the criterion and including input specifying which data elements must be met as part of the fraction in order to qualify a record as having satisfied the said specifying set of criteria; and
   (c) searching the database for records whose data elements meet the criteria.

6. A method for allowing employees to select and rank their preferred job assignments, comprising:
   (a) creating a computer readable database with a record for each possible assignment, each record including more than six data elements which data elements each specify a characteristic of the assignment;
   (b) receiving input from an employee at a computer terminal specifying a first set of criteria;
   (c) searching the database for records whose data elements meet said first set of criteria;
   (d) displaying to the employee an indication of the extent to which each criterion in said first set of criteria reduces the number of qualifying records from the database of records;
   (e) receiving input from an employee at a computer terminal specifying a second set of criteria;
   (f) searching the database for records whose data elements meet said second set of criteria; and
   (g) displaying to the employee an indication of the extent to which each criterion in said second set of criteria reduces the number of qualifying records from the database of records and the difference between said first set of criteria and said second set of criteria.

7. A computer readable storage medium encoded with executable instructions representing a computer program that can cause a computer to perform a method for allowing employees to select and rank their preferred job assignments, the method comprising:
   (a) creating a computer readable database with a record for each possible assignment, each record including more than six data elements which data elements each specify a characteristic of the assignment;
   (b) receiving input from an employee at a computer terminal specifying a first set of criteria, searching the database for a first group of records whose data elements meet all the criteria, copying the first group of records to a memory;
   (c) displaying to the employee information showing the number of records in the first group;
   (d) receiving input from the employee at the computer terminal specifying a second set of criteria, searching the database for qualifying records whose data elements meet all the criteria, comparing the records to those already in the memory, and copying to the memory, as a second group of records, those qualifying records which are not already in the memory.

8. The computer readable storage medium that can cause a computer to perform the method of claim 7 wherein the first group of records and the second group of records are copied to the memory in locations which, upon presenting the contents of the memory, cause the first group of records to be presented first and the second group of records to be presented second.

9. The computer readable storage medium of claim 8 wherein the method further comprises:
   (a) displaying to the employee information showing the number of records in the first and second groups;
   (b) receiving input from the employee at the computer terminal specifying a third set of criteria, searching the database for third qualifying records whose data elements meet all the criteria, comparing the qualifying records to those already in the memory, and copying to the memory, as a third group of records, those qualifying records which are not already in the memory.

10. The computer readable storage medium of claim 9 wherein the method further comprises:

(a) receiving from the employee instructions to delete a group of records from the memory or modify the sequence of groups of records in the memory; and (b) executing the instructions.

11. A computer readable storage medium encoded with executable instructions representing a computer program that can cause a computer to perform a method for allowing employees to select and rank their preferred job assignments, the method comprising:

(a) creating a computer readable database with a record for each possible assignment, each record including more than six data elements which data elements each specify a characteristic of the assignment;

(b) receiving input from an employee at a computer terminal specifying a set of criteria, including a criterion that a record will qualify if a fraction of its data elements, which fraction is less than all and more than none, meets the criterion and including input specifying which data elements must be met as part of the fraction in order to qualify a record as having satisfied the said specifying set of criteria; and (c) searching the database for records whose data elements meet the criteria.

12. A computer readable storage medium encoded with executable instructions representing a computer program that can cause a computer to perform a method for allowing employees to select and rank their preferred job assignments, the method comprising:

(a) creating a computer readable database with a record for each possible assignment, each record including more than six data elements which data elements each specify a characteristic of the assignment;

(b) receiving input from an employee at a computer terminal specifying a first set of criteria;

(c) searching the database for records whose data elements meet said first set of criteria;

(d) displaying to the employee an indication of the extent to which each criterion in said first set of criterion reduces the number of qualifying records from the database of records;

(e) receiving input from an employee at a computer terminal specifying a second set of criteria;

(f) searching the database for records whose data elements meet said second set of criteria; and (g) displaying to the employee an indication of the extent to which each criterion in said second set of criterion reduces the number of qualifying records from the database of records and the difference between said first set of criteria and said second set of criteria.

* * * * *